UNITED STATES PATENT OFFICE.

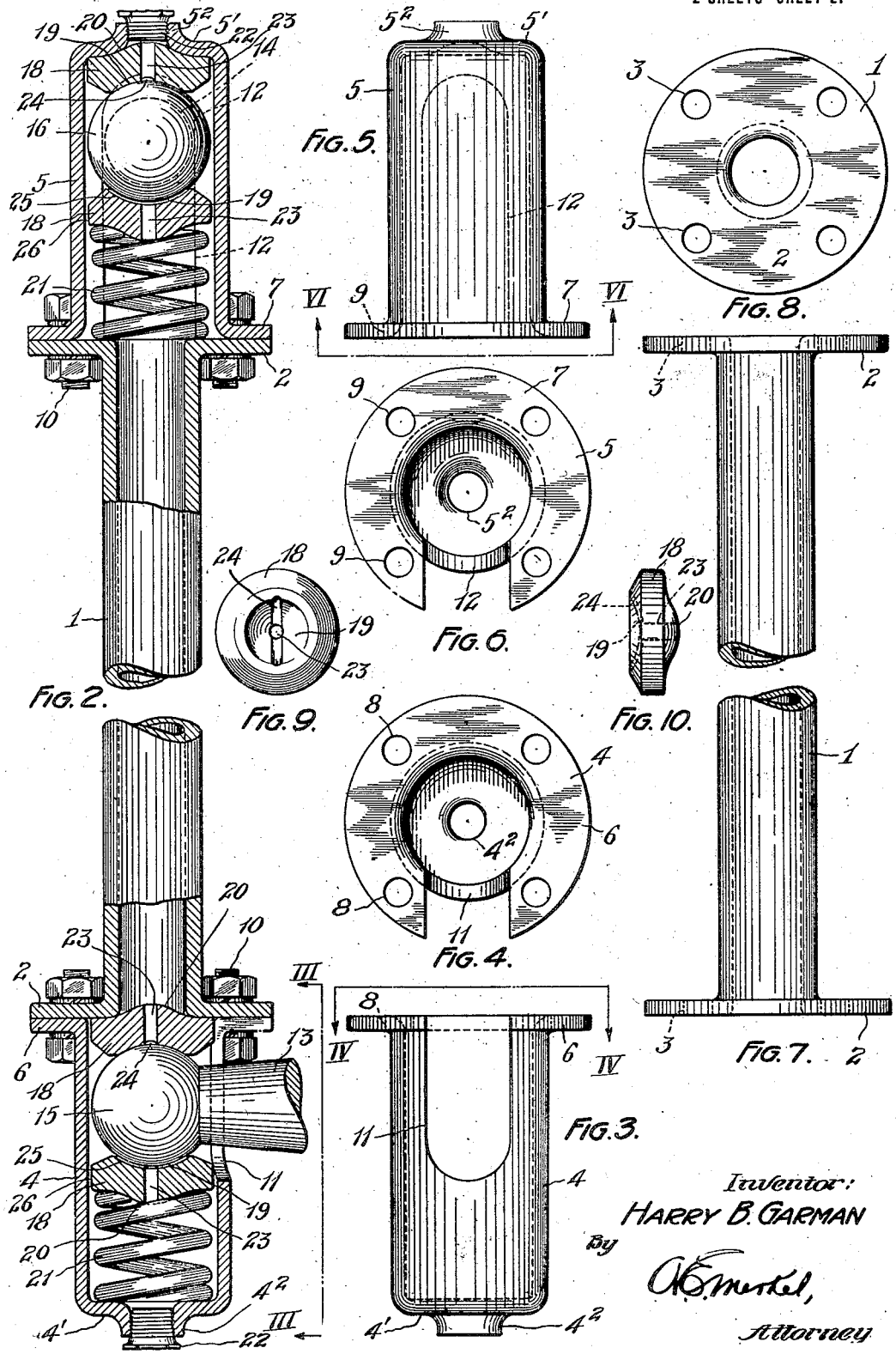

HARRY B. GARMAN, OF DETROIT, MICHIGAN, ASSIGNOR TO THE STEEL PRODUCTS COMPANY, OF CLEVELAND, OHIO, A CORPORATION OF OHIO.

DRAG LINK.

1,416,189.  Specification of Letters Patent.  Patented May 16, 1922.

Application filed August 2, 1921. Serial No. 489,364.

*To all whom it may concern:*

Be it known that I, HARRY B. GARMAN, a citizen of the United States, resident of Detroit, county of Wayne, and State of Michigan, have invented new and useful Improvements in Drag Links, (Case D,) of which the following is a specification, the principle of the invention being herein explained and the best mode in which I have contemplated applying that principle, so as to distinguish it from other inventions.

My invention relates to drag links for use as a part of the steering mechanism of automobiles, and particularly to apparatus of this character of a weldless type. The objects of the invention are to design a drag-link of uniform thickness of metal, light and cheap to manufacture, which cannot be shaken off or cannot drop off the connecting arm, and of a construction by which the same link can be assembled either on a right or left hand drive car.

The annexed drawings and the following description set forth in detail certain means embodying my invention, the disclosed means, however, constituting but one of the various mechanical forms in which the principle of the invention may be employed.

In said annexed drawings:—

Figure 2 represents a broken plan view of my improved drag link, partly in section;

Figure 3 represents a side elevation, taken from the plane indicated by the line III—III, Figure 2, of the socket of my improved link within which the ball of the steering crank arm is journaled;

Figure 4 represents an end view of the socket shown in Figure 3, taken from the elevation indicated by the line IV—IV, Figure 3;

Figure 5 represents a plan view of the socket of my improved drag link, within which the ball of the arm connected with the running wheels is journaled;

Figure 6 represents an end view of the socket shown in Figure 5, taken from the plane indicated by the line VI—VI, Figure 5; Figure 7 represents a broken plan view of an intermediate tubular member forming part of my improved drag link;

Figure 8 represents an end view of the intermediate member shown in Figure 7;

Figure 9 represents a plan view of an improved bearing block forming part of my invention, the same being manufactured by a new and improved process not included in the subject-matter claimed in this application; and Figure 10 represents a side elevation of said bearing block.

Figure 1:
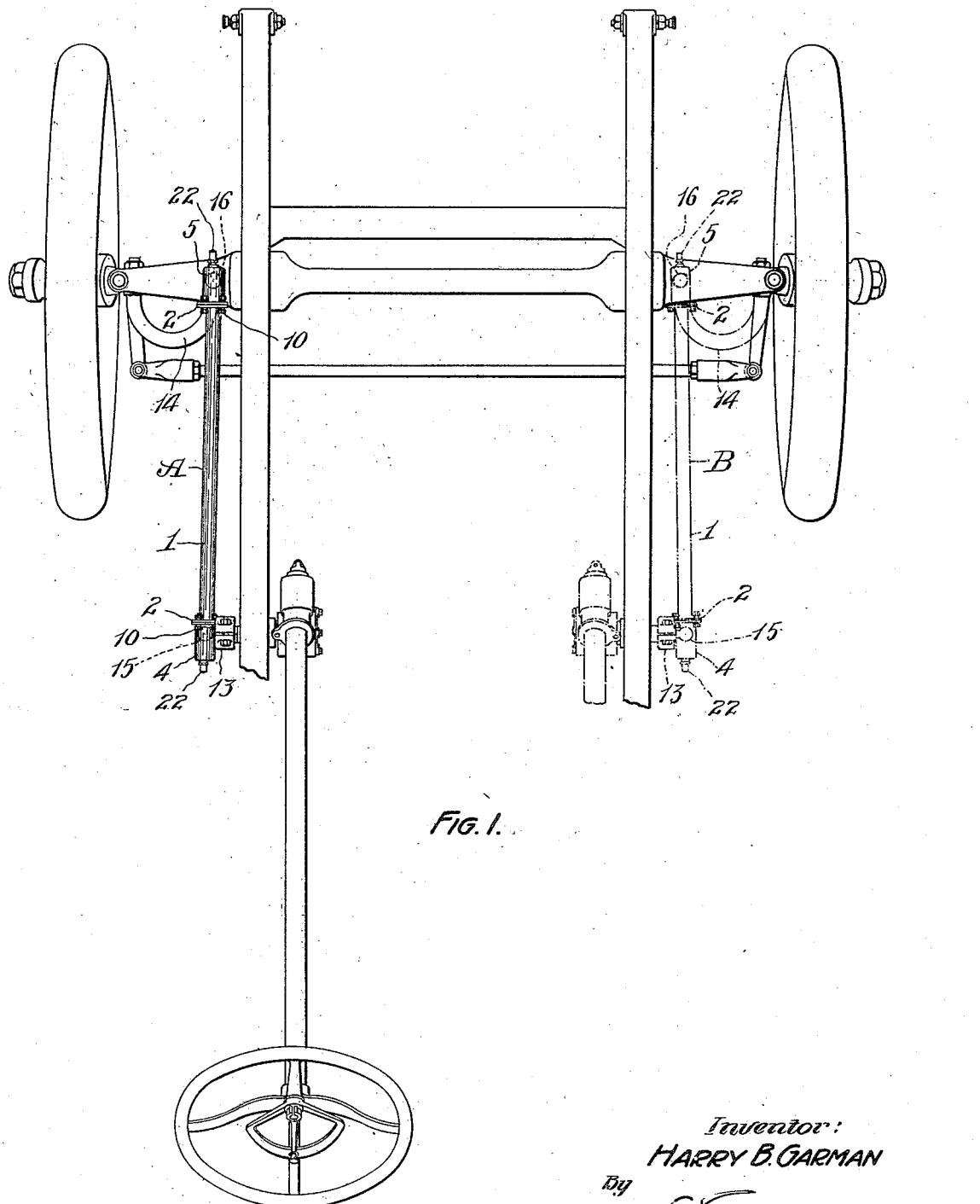
Figure 1 represents a plan view of fragmentary portions of the chassis of an automobile, showing my improved drag-link in relation to the stearing and axle arms, and also showing the possibilities of using the same link for either a right or left-hand drive car.

Referring to the annexed drawings, in which the same parts are indicated by the same ordinals in the several views, an intermediate member of my improved drag link is indicated by the ordinal 1, the same being, in the form of device illustrated, made from standard seamless steel tubing. This tubing element is formed on both ends with a flange 2 upset, this flange having drilled therethrough the holes 3. Removably secured to said intermediate tubular element 1 are end sockets 4 and 5 whose open ends communicate with the tube 1, and whose outer ends 4' and 5', respectively, are closed and formed of metal continuous with the walls of the socket. These sockets 4 and 5 are stamped from hot-rolled annealed and pickled strip steel, and have inner end flanges 6 and 7 respectively, through which are drilled the holes 8 and 9 respectively, adapted to register with the tube holes 3, whereby, by means of the bolts 10 the intermediate tube 1 and sockets 4 and 5 are removably secured together to form the complete casing of the link.

The sockets 4 and 5 are formed with extended slots 11 and 12 respectively, open at their inner ends, providing for the lateral shifting of the connecting arms hereinafter described. These connecting arms are, respectively, the steering crank arm 13 and a connection 14 with the running wheels. These arms are formed at their inner ends with balls 15 and 16, which are journaled in the sockets 4 and 5. The width of the extended slots 11 and 12 is less than the diameter of the adjacent balls 15 and 16, so that there is no chance for the drag-link to drop off the ball arm. The balls 15 and 16 are journaled in improved blocks 18, as plainly shown in Figure 2, these blocks having bearing surfaces 19 and oppositely disposed substantially similar convex projections 20, plainly shown in Figure 10. A new and improved method of making these blocks 18 forms the subject-matter of my companion application, Serial No. 489,365, filed August 2, 1921. As is usual in constructions of this nature, springs 21 are provided, the same being made from round spring steel in the usual way, and disposed, respectively, between the closed end of the socket 4 and a bearing block 18 adjacent the ball 15 in the case of the steering crank arm of the link, and, in the case of the axle ball arm of the link, being disposed between the adjacent end of the intermediate tube 1 and a bearing block 18 disposed adjacent the ball 16.

In order efficiently to lubricate bearing surfaces 19, I draw bosses 42 and 52 in the outer ends of the sockets 4 and 5, respectively, within which can be accommodated grease cups 22. Heretofore, insofar as I am aware, the distribution of the grease from the cups to the ball, in this form of construction, was dependent upon some play or leakage between the adjacent bearing 18 and the wall of the socket or intermediate tubular member against which the bearing abutted, insofar as the closed end of the socket was concerned. In Figure 2, in so far as socket 5 is concerned, this wall is the outer end 5' of the socket 5. I have provided direct passage for the lubricant through this bearing by means of forming a hole 23 through and centrally of the bearing, which hole 23 terminates in a channel 24 formed in the bearing surface 19. Insofar as the bearing intermediate a ball 15 or 16 and the spring 21 is concerned, I have also formed the same with a hole 23 communicating with a channel 25 formed in the bearing surface 19 and lying in a plane substantially at right angles to the plane containing the channel 24. The relative right angular arrangement of the channels 24 and 25 serve best to lubricate the entire surface of the balls 15 and 16. Although the bearing 18, upon either end of the drag-link, which is adjacent the spring 21, is spaced from the socket 4 or 5 so as to leave a small clearance area 26 through which grease would be forced or would seep, this bearing is also shown formed with the hole 23 and the channel 25 because I thereby obviate the necessity of manufacturing two forms of bearings, the bearing with the channel 25 being identical with the bearing 18 having the channel 24, but turned through an angle to bring the channel in a plane at an angle to the channel in the opposed bearing, preferably, an angle of 90°, insofar as the first assembly is concerned.

One of the important advantages of my design of weldless drag-link consists in the fact that the same link can be used either for a right or left hand drive car. This is plainly illustrated in Figure 1, wherein the link is shown in its relation to the steering arm and the axle arm of the chassis. In full lines is shown the assembly for the left hand drive. In dotted lines is indicated the assembly for right hand drive. The link "A" can be used for the position "B" simply by removing the socket 4 from the adjacent end of the tube 1 and turning the socket and its associated steering arm connection through 180 degrees, whereby relations will be such as to allow the assembly indicated by "B", Figure 1.

I wish particularly to point out that by means of a weldless link assembled as described, I eliminate the weakness occasioned by the large drill holes through which steering and axle arm balls are inserted in the welded or one-piece type link and, also, that my weldless type provides a socket shorter from the center of the ball to the end of the socket, because of the elimination of the usual end plug in the welded or one piece link. Therefore, when the link is used as a cross-tube or tie-rod, more clearance is given for the grease-cups 22.

What I claim is:

1. In a weldless type drag link, the combination of an intermediate member; an end socket removably secured thereto; a member secured to the other end of said intermediate member; a connecting member secured to said last-mentioned end member; and a second connecting member journaled in and secured to said socket, the latter being formed with an extended slot open at its inner end and providing for the lateral shifting of its connecting member.

2. In a weldless type drag link, the combination of an intermediate member having a flange at one end; a socket secured thereto by means of a co-operating flange; a member secured to the other end of said intermediate member; a connecting member secured to said last-mentioned end member; and a second connecting member journaled in and secured to said socket, the latter being formed with an extended slot open at its inner end and providing for the lateral shifting of its connecting member.

3. In a weldless type drag link, the combination of an intermediate member having a flange at one end; a socket secured thereto by means of a co-operating flange; a member secured to the other end of said intermediate member; a connecting member secured to said last-mentioned end member; and a steering crank arm having a ball journaled in said socket, the latter being formed with an extended slot open at its inner end and of a width less than the diameter of the crank arm ball.

4. In a weldless type drag link, the combination of a tubular intermediate member; a socket whose open end communicates with one end of said intermediate member, the outer end of said socket being closed and formed of one piece with the walls thereof, said socket being removably secured to said tubular member; a member secured to the other end of said tubular member; a connecting member secured to said last-mentioned end member; and a second connecting member journaled in and secured to said socket; the latter being formed with an extended slot open at its inner end and providing for the lateral shifting of its connecting member.

5. In a weldless type drag link, the combination of a tubular intermediate member; sockets whose open ends, respectively communicate with the ends of said intermediate member, the outer ends of said sockets being closed and formed of one piece with the walls thereof, said sockets being secured to said tubular member by means of co-operating flanges on said sockets and said member; a steering crank arm and an element connected with the running wheels having balls, respectively, journaled in said sockets, the latter being formed respectively, with extended slots open at their inner ends and of a width less than the diameter of the adjacent ball.

6. A drag link comprising, a tubular body member having a relatively wide outturned flange at one end thereof; a socket member comprising a short piece of tubing having an outturned flange at the inner end thereof; and means for detachably securing the flange of the socket member to the flange of the body member.

7. A drag link comprising, a tubular body member having a relatively wide outturned flange at one end thereof; a cylindrical socket member of greater diameter than said body member, the outer end of said socket member being closed and the inner end thereof being provided with outturned flanges; and means for detachably securing the flange of the socket member to the flange of the body member.

8. A drag link comprising, a body member; and a cup shaped one piece end socket member having its closed end outermost and its open inner end detachably secured to the end of said intermediate member.

9. A drag link comprising, an intermediate member; and cup shaped one piece end socket members having their closed ends outermost and their inner open ends detachably secured to the ends of said intermediate member, the closed ends of said socket members being tapped to receive grease cups.

Signed by me this 13th day of May, 1921.

HARRY B. GARMAN.